United States Patent [19]

Hurley

[11] Patent Number: 4,893,947

[45] Date of Patent: Jan. 16, 1990

[54] SPINNING MACHINE ROTOR SHAFT DISK

[76] Inventor: Robert E. Hurley, Route #3, Box 375-B, Sophia, N.C. 27350

[21] Appl. No.: 300,586

[22] Filed: Jan. 23, 1989

[51] Int. Cl.⁴ ..................... F16C 13/00; D01H 7/882
[52] U.S. Cl. ..................................... 384/549; 57/406
[58] Field of Search ................. 384/445, 549, 125; 57/103, 406

[56] References Cited

U.S. PATENT DOCUMENTS 3,313,096  4/1967  Marciniak ........................... 57/103
4,020,710  5/1977  Gassner et al. ..................... 57/103 X
4,713,932  12/1987  Zott ..................................... 57/406

FOREIGN PATENT DOCUMENTS 3205566  8/1983  Fed. Rep. of Germany ...... 384/549

Primary Examiner—Thomas R. Hannon

[57] ABSTRACT

A rotor shaft disk is presented which is formed from synthetic components and includes a plastic hub construction which provides the disk with durabilty and long wear characteristics. The hub is formed from a glass-filled thermoplastic nylon-based resin and includes a series of indentions therearound for joining to the tire. The indentions are formed in the hub to undercut the surface of the hub whereby during the manufacturing process the elastomer of the tire fills the indentions for superior structural integrity of the disk.

17 Claims, 2 Drawing Sheets

//4,893,947//

SPINNING MACHINE ROTOR SHAFT DISK

BACKGROUND OF THE INVENTION

1. Field Of The Invention

The present invention provides a two component disk for use for guidingly supporting a rotor shaft on an open end spinning textile machine.

2. Description Of The Prior Art And Objectives Of The Invention

Open end spinning machines have greatly improved their production capacity through various technological advances in recent years whereby the rotor shafts turn in excess of 100,000 rpms. Disks which rotate the shafts are generally formed with metal cores or hubs with synthetic rubber or other polymer tires attached to the periphery thereof with a suitable adhesive or with a mechanical "lock" between the hub and tire. Various disks have worked well at lower rpms, but with the rotor shafts of today approaching 120,000 rpms, disk failure has become increasingly frequent with the tire separating from the hub and causing the open end spinning machine to be down for an extended period until new disks are installed. Disk failure can be due to the increased centrifugal force on the tires and the increased frictional heat which is a result of the high speed operation. The convenional metal hub disks which are machined to shape, oftentimes incur flaws which distort the hub and cause problems due to their lack of uniformity and balance. At high speeds these defects become readily apparent and create production problems as a result of the machine down time.

Therefore, with the problems associated with conventional shaft disks, the present invention was conceived and one of its objectives is to provide a rotor shaft disk utilizing a synthetic polymer hub which is connected to a thermoplastic elastomer tire.

It is another objective of the present invention to provide a rotor shaft disk which will withstand the rotational forces and heat build-up for long periods of time when operated at high speeds.

It is also an objective of the present invention to provide a rotor shaft disk which is formed from two different synthetic components which are mechanically bonded to insure a long trouble-free life.

Other advantages and objectives of the present invention will be recognized by those skilled in the art as the details thereof are fully presented below.

SUMMARY OF THE INVENTION

The aforementioned objectives can be achieved by a disk formed with a synthetic thermoplastic nylon-based hub having a resilient polyester tire mounted on the periphery thereof. The hub includes a substantially circular periphery having a plurality of indentions therein. The indentions may be of various shapes and allow the resilient polyester material of the tire which is molded on the hub to flow into the indentions to thereby form a mechanical bond between the tire and the hub.

DESCRIPTION OF THE PREFERRED EMBODIMENT

The preferred form of the rotor shaft disk of the present invention consists of a hub formed from a nylon-based thermoplastic which is glass-filled, having a glass fiber content of 5% to 10% by weight of the thermoplastic resin which is tough and durable. The tire is formed from a flexible elastomer such as DuPont's Hytrel 5556 having a melting point in excess of 300 degrees Farenheit. The hub is formed from NyRim 6051 (a trademark of DSM Rim Nylon, Inc.). Pairs of opposingly positioned indentions which undercut the surface of the hub in the polyester hub are filled by the tire elastomer during formation to mechanically lock the tire and hub to insure disk integrity during high speed operation of the disk.

DETAILED DESCRIPTION OF THE DRAWINGS AND OPERATION OF THE INVENTION

Figure 1:
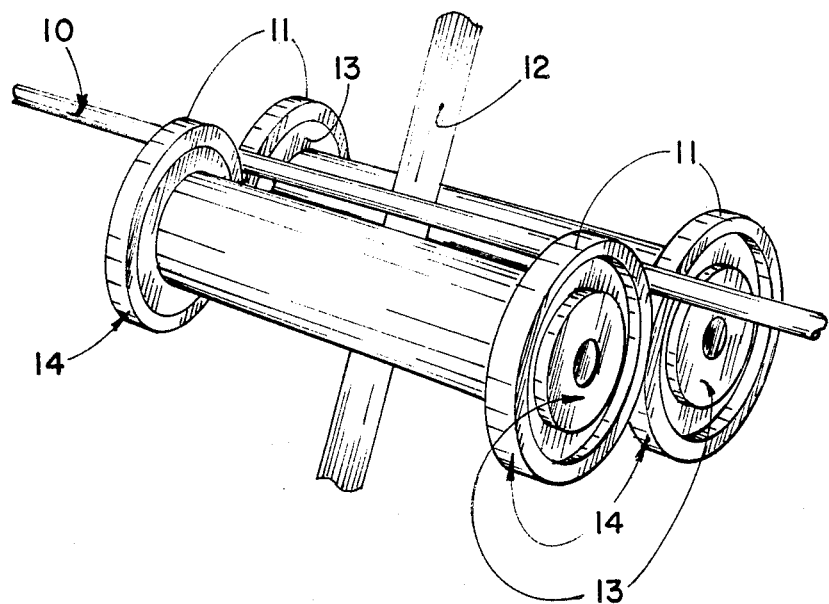
FIG. 1 demonstrates a rotor shaft of an open end spinning machine driven by two pairs of disks.

Turning now to the drawings, in FIG. 1 a spinning machine rotor shaft 10 in fragmented form is shown rotated by two pairs of rotor disks 11 which are axially driven by belt 12. As would be understood, rotor shaft 10 is positioned within the "V's" between the pairs of disks 11 and rotates at speeds in excess of 100,000 rpms. Each disk 11 has a hub 13 consisting of a nylon-based thermoplastic which has been 5-10% glass-filled for additional strength and durability. Positioned on the circumferential edge of disk 13 is a tire 14 which is formed from a somewhat flexible polymer such as Hytrel ® by E.I. du Pont de Nemours & Co., Inc. of Wilmington, Del.

It is well documented in the textile spinning trade that shaft disks fail, oftentimes due to the separation of the tire from the hub which said hub is conventionally made of metal such as aluminum. In order to overcome this problem and to provide a disk with superior integrity, disk 15 shown in FIG. 2 whereby hub 20 is formed from a 5-10% glass fiber filled nylon type thermoplastic resin (as conventional and well known in the plastic molding art). Tire 21 is formed from a polyester thermoplastic elastomer with a relatively high melting point and otherwise suitable for high speed operations as the melting point of the elastomer used is in excess of 300 degrees F. Conventional techniques are used to manufacture disk 15 whereby hub 20 is first formed by conventional thermoplastic resin molding techniques and thereafter elastomer tire 21 is formed therearound also utilizing conventional methods.

Figure 7:
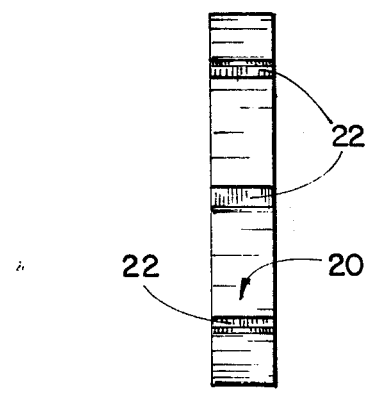
FIG. 7 demonstrates a top plan view of the disk as shown in FIG. 2 with the tire removed therefrom.
Figure 2:
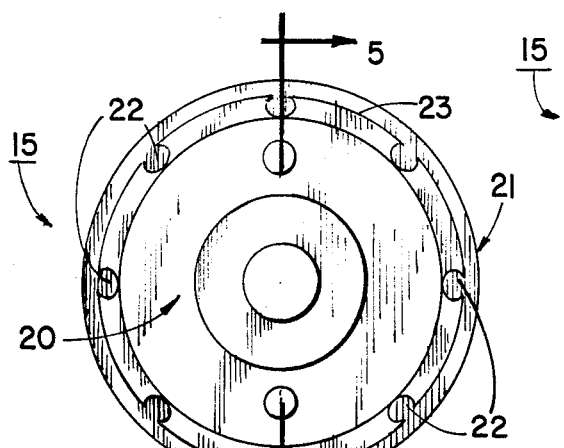
FIG. 2 demonstrates a front view of the first embodiment of the rotor shaft disk of the invention.

As further shown in FIG. 2, hub 20 includes a series of indentions 22 opposingly spaced around the periphery of hub 20 and penetrating below the circumferential surface thereof. As seen, indentions 22 have a circumferential width below the outer surface 23 of hub 20 greater than the width of the opening of the indentions 22 along surface 23. Indentions 22 therefore "undercut"

the surface by having a radial width below surface 23 greater than the opening at surface 23 thereof, forming a "lock" which prevents tire 21 from separating from hub 20 under adverse high speed operating conditions or under attempted distortions of hub 20 or tire 21. As shown in FIG. 7 indentions 22 extend the axial width of hub 20 and thereby easily accept the heated liquid tire elastomer of tire 21 during manufacture.

Figures 5, 6:
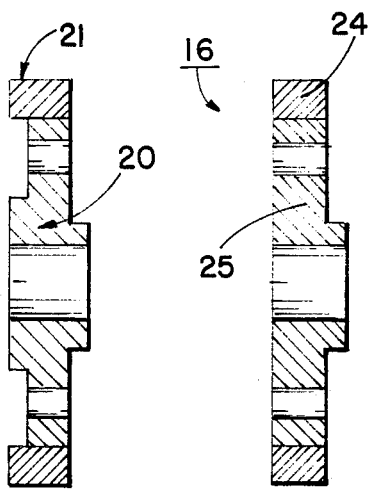
FIG. 5 demonstrates a cross sectional view along line 5—5 of FIG. 2.
FIG. 6 demonstrates a cross sectional view through line 6—6 of FIG. 3.
Figure 3:
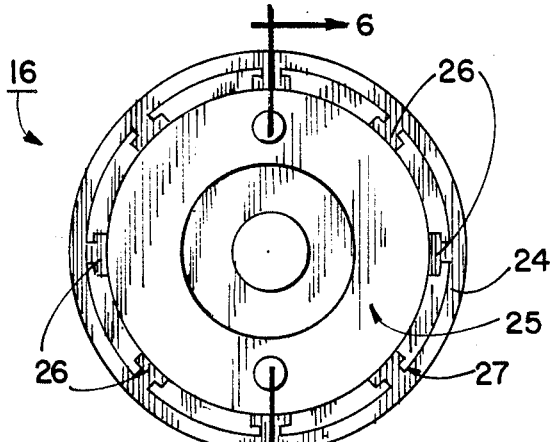
FIG. 3 demonstrates a second embodiment of the invention.

As seen in FIG. 5, tire 21 extends the full axial width of hub 20 and disk 16 (FIG. 6) also includes an elastomer tire 24 and a rigid glass-filled nylon type thermoplastic hub 25 but provides an inverted t-shaped indention 26. In FIG. 3, indentions 26 undercut the circumferential surface 27 of hub 25 to thereby lock tire 24 and hub 25 together in a secure, fail-proof fashion.

As shown in FIG. 6, indentions 26 also extend the axial width of hub 25.

Figure 4:
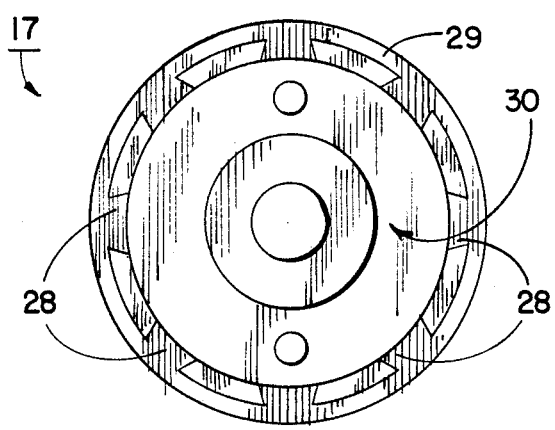
FIG. 4 demonstrates yet another embodiment of the invention.

In FIG. 4, yet another indention 28 is shown having a substantially wedge-shaped configuration. Tire 29 is positioned into indentions 28 to securely bond tire 29 and hub 30 as earlier explained. As seen in embodiments of hubs 20, 25 and 30, indentions 22, 26 and 28 respectively have a circumferential width below the peripheral surface of the hub greater than the opening or mouth of the indention on the peripheral surface of the disks to mechanically bond the tire and hub into a integral disk having extremely good durability and life even under adverse operating conditions.

The illustrations and examples provided herein are for explanatory purposes and are not intended to limit the scope of the appended claims.

I claim:

1. A disk to support a spinning machine rotor shaft comprising: a hub formed from a rigid material, a tire, said tire formed from an elastomeric material, said hub having a substantially circular periphery, said periphery defining an indention, said indention having a width below the outer circular surface of said periphery greater than the width of said indention at said outer circular surface, said indention for receiving said tire for affixing said tire to said hub.

2. A disk as claimed in claim 1 wherein said hub is formed from a thermoplastic resin.

3. A disk as claimed in claim 2 wherein said thermoplastic resin is glass-filled.

4. A disk as claimed in claim 3 wherein said glass-filled resin comprises a minimum 5% glass fibers by weight.

5. A disk as claimed in claim 3 wherein said glass-filled resin comprises a minimum 10% fibers by weight.

6. A disk as claimed in claim 1 wherein said indentation extends laterally across the entire axial width of said hub.

7. A disk as claimed in claim 6 wherein the circumferential width of said indention is greater below the outer circular surface than the circumferential width of said indention at said outer circular surface.

8. A disk as claimed in claim 1 wherein said indention extends radially into said hub below said circular periphery.

9. A disk as claimed in claim 1 wherein said indention is wedge shaped.

10. A disk as claimed in claim 1 wherein said indention is T-shaped.

11. A disk as claimed in claim 1 wherein said indention is circularly-shaped.

12. A disk as claimed in claim 1 wherein said tire is formed from a synthetic elastomer.

13. A disk as claimed in claim 12 wherein said elastomer comprises a nylon-based thermoplastic material.

14. A disk to support a spinning machine rotor shaft comprising: a rigid hub, said hub formed from a glass-filled thermoplastic resin, a tire, said tire formed from a flexible plastic, said tire attached to said hub, said hub having a substantially circular periphery, said periphery defining a plurality of indentions radially inwardly therealong, said indentions having a circumferential width below said circular periphery greater than the circumferential width of said indentions along said circular periphery.

15. A disk as claimed in claim 14 wherein said indentions are wedge-shaped.

16. A disk as claimed in claim 14 wherein said indentions are T-shaped.

17. A disk as claimed in claim 14 wherein said indentions are circularly-shaped.

* * * * *